United States Patent [19]

McGlone et al.

[11] Patent Number: 5,220,793
[45] Date of Patent: Jun. 22, 1993

[54] CENTRIFUGAL PUMP FUEL SYSTEM

[75] Inventors: Michael E. McGlone, Palm Beach Gardens; Louis J. Larkin, Lake Clarke Shores; Rodney O. Johnson, Lake Worth; Kurt A. Moeller, Palm Beach Gardens, all of Fla.

[73] Assignee: United Technologies Corporation, Hartford, Conn.

[21] Appl. No.: 906,193

[22] Filed: Jun. 29, 1992

[51] Int. Cl.$^5$ .............................................. F02C 7/22
[52] U.S. Cl. ........................................ 60/734; 415/49
[58] Field of Search ............................ 60/39.281, 734; 137/568; 415/49, 119; 417/300

[56] References Cited

U.S. PATENT DOCUMENTS

| | | | |
|---|---|---|---|
| 2,986,883 | 6/1961 | Li | 60/734 |
| 3,048,117 | 8/1962 | Frazen et al. | 103/87 |
| 3,826,586 | 7/1974 | Richards | 415/42 |
| 4,487,548 | 12/1984 | Leachman, Jr. et al. | 415/28 |
| 4,612,766 | 9/1986 | Eder | 60/734 |
| 4,652,222 | 3/1987 | Aiba | 137/568 |

OTHER PUBLICATIONS

Dussourd, J. L., Pfannebecker, G. W., Singhania, S. K., *An Experimental Investigation of the Control of Surge in Radial Compressors Using Close Coupled Resistances*, Mar. 1977, ASME, pp. 64, 65, 72.

Greitzer, E. M., *The Stability of Pumping Systems-The 1980 Freeman Scholar Lecture*, Jun. 1981, vol. 103/193, ASME, pp. 193-214.

*Primary Examiner*—Louis J. Casaregola
*Attorney, Agent, or Firm*—Edward L. Kochey, Jr.

[57] ABSTRACT

A centrifugal pump has a rising characteristic at low flows, leading to pressure pulsations in the fuel system at low flow. A pressure difference regulating valve at the pump discharge has a frequency response such that the valve does not significantly move in response to the pulsations. The valve responds to less rapid changes, thereby avoiding high pressure loss at high flows.

7 Claims, 8 Drawing Sheets

CENTRIFUGAL PUMP FUEL SYSTEM

The Government has rights in this invention pursuant to a contract awarded by the Department of the Air Force.

DESCRIPTION

1. Technical Field

The invention relates to centrifugal pumps having a rising pump characteristic at low flows, and in particular to the pressure/flow stabilization thereof.

2. Background of the Invention

Centrifugal pumps have the ability to pump fuel at a wide range of flow rates. As a result a single high pressure, high capacity centrifugal pump can replace the two pump system traditionally used for gas turbine engine fuel systems. This two-for-one trade results in a significant cost and weight savings The usual centrifugal pump has a continuously dropping head/flow characteristic which leads to stable pump operation. Such a pump however is inefficient at low flows and causes excessive temperature rise in the fuel when applied to the fuel system of the gas turbine engine. In order to minimize this overheating effect, the pumps are designed to reduce the head rise of the pump at low flows. This reduces the amount of power which the pump dissipates into the fuel. However this leads to a rising head flow characteristic at low flow rates.

In applying such a pump to an aircraft fuel system at idle flow rates an instability was observed. This was characterized by a 35 to 50 hertz, 100 to 300 psi pump discharge pressure oscillation. Only by increasing the flow beyond that desirable for idle operation, and recirculating the flow could the oscillations be avoided. This has the disadvantage of overheating fuel contained within the fuel system.

Instability frequency and minimum flow requirements (to avoid pulsation) were dependent on the volume of the plumbing system. This is caused by a phenomenon known as pump-stall instability.

Such instability is unacceptable in an operating system because the oscillations are severe. This would be damaging to external components. It is known that the instability can be overcome by the location of an orifice at the discharge of the pump. This however creates in intolerable pressure drop at high loads. Manual operation changing the orifice is inappropriate over the range required during each mission

SUMMARY OF THE INVENTION

The centrifugal pump is of the design having at constant speed a rising head/flow characteristic at low pump flows. The plumbing system receiving flow from the pump has at least one control valve located downstream of and defining a discrete volume of the plumbing system. The plumbing system has a resonant frequency which is defined by the volume, the physical geometry and material of the plumbing system and the bulk modulus of the fuel.

A pressure difference regulating valve is located immediately adjacent the discharge of the pump, being upstream of the vast majority of the discrete volume. This valve preferably has a minimum opening and a frequency response which is significantly less than the frequency response of the plumbing system. Accordingly such a valve will respond sufficiently slowly to operate as an orifice during the instability pulsations. It, however, responds sufficiently rapidly to respond to load changes during higher operating conditions.

The only penalty to the system at high flows is the defined pressure loss across the valve which is being maintained by this pressure difference regulating valve. Stabilization at low flows is achieved without pilot intervention.

BRIEF DESCRIPTION OF THE DRAWINGS

FIGS. 8A and 89B are Bode plot of the valve and pump combination; and

DESCRIPTION OF THE PREFERRED EMBODIMENT

Figure 1:
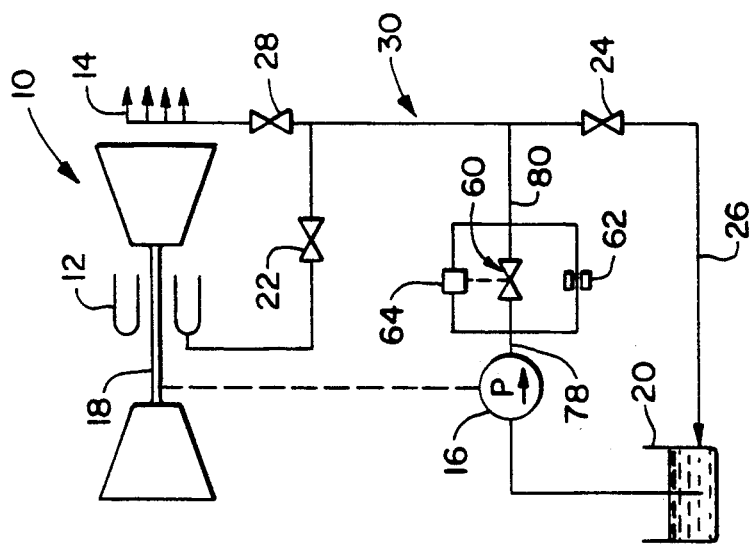
FIG. 1 is a schematic of a gas turbine engine fuel supply system.

FIG. 1 schematically illustrates a gas turbine engine 10 with combustors 12 and augmentor 14. A fuel pump 16 is driven from turbine shaft 18.

Pump 16 takes suction from fuel tank 20 delivering fuel through metering valve 22 to the combustors 12. Recirculation valve 24 and recirculation line 26 permits recirculation of excess flow.

Augmentor valve 28 may be opened for afterburning operation. This delivers fuel to the augmentors 14.

The plumbing system 30 from the discharge of the pump 16 has a discrete volume defined by valves 22, 24 and 28. This not only has a discrete volume but also a known geometry including materials with known load strain characteristics.

Figure 2:
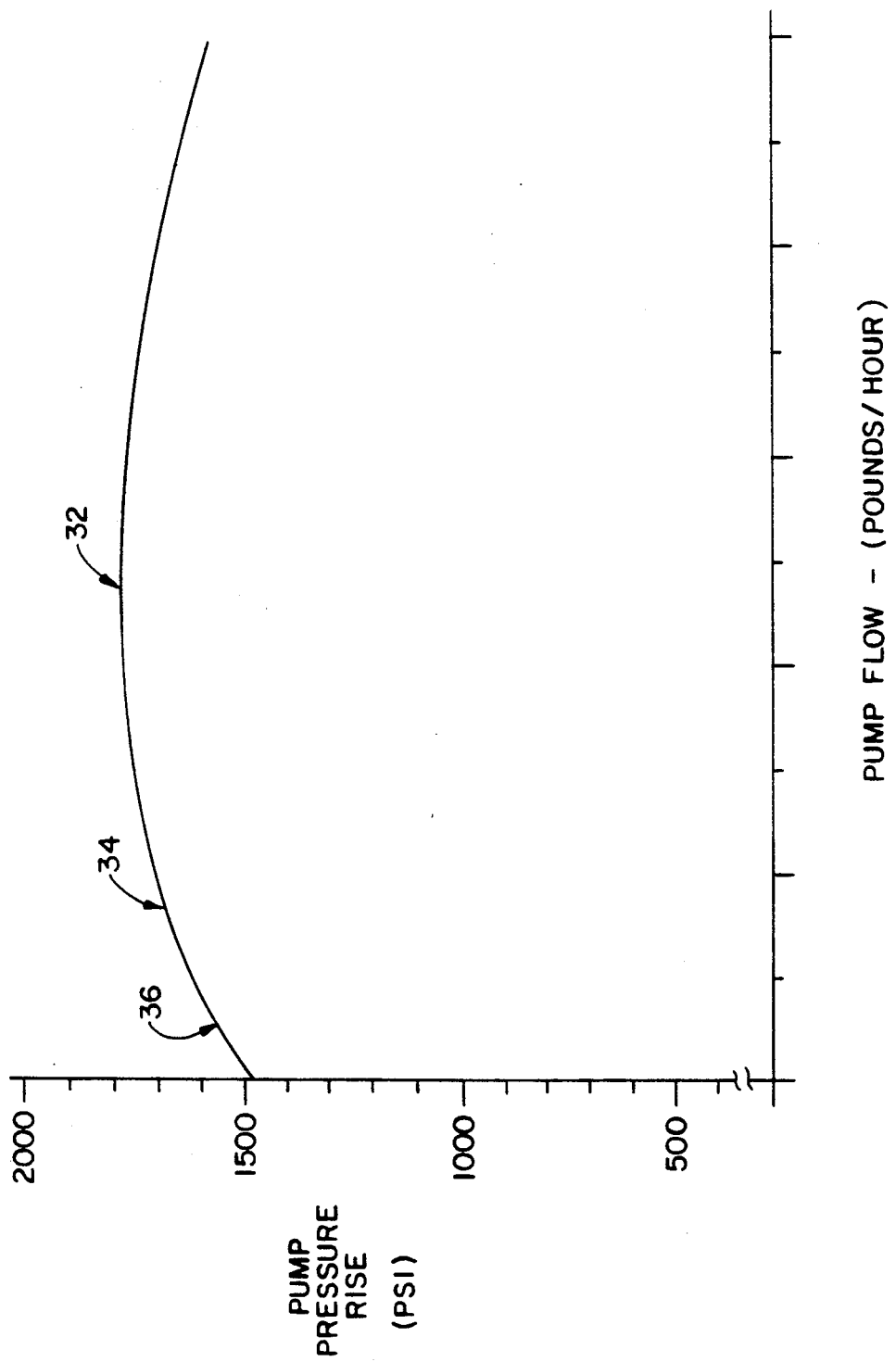
FIG. 2 is a pump curve showing the pump characteristic.

Referring to FIG. 2 the pump 16 has a head/flow characteristic 32 including a rising characteristic 34 at low flows. The pump is designed to have this characteristic to avoid overheating of the fuel during low flow operation. The idle flow condition of approximately five thousand pounds per hour is located at point 36 on this curve which is in the rising characteristic portion. It is the slope of the rising characteristic at this flow rate which is the problem.

Figure 3:
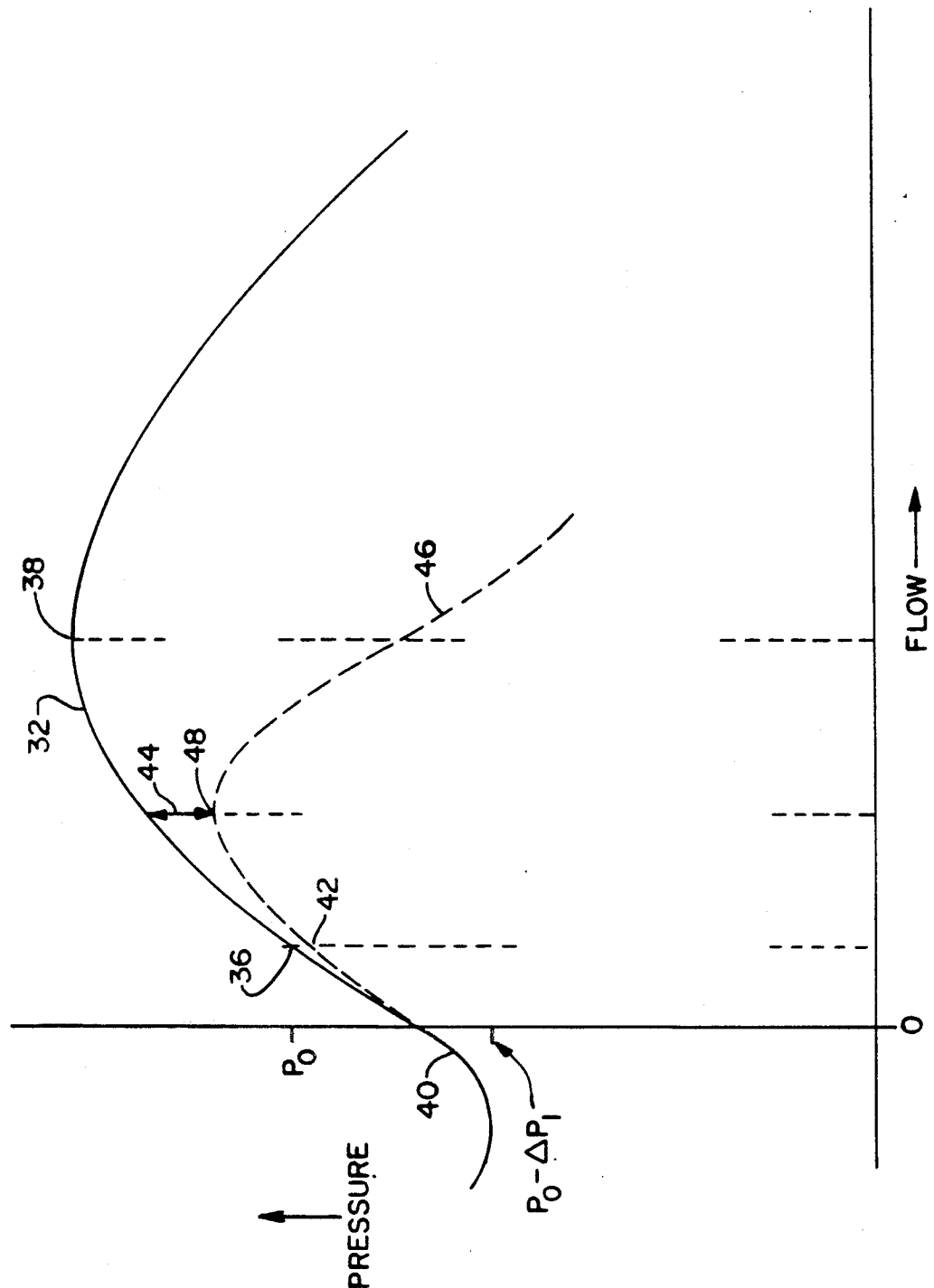
FIG. 3 is a portion of the pump curve for discussion of the problem.

FIG. 3 again shows the pump curve 32 and the desired idle operating point 36. At the desired flow condition such as 36, the pump is delivering fuel which is distributed between the recirculating line and the combustors.

With a slight perturbation the flow increases along with the rising pressure characteristic of the pump. This causes the introduction of excess fluid within the plumbing volume with only a nominal change in the outflow from the volume. This increased flow starts to build up pressure within the plumbing system, but the increased pressure pump discharge permits the pump to discharge more flow. This continues until the pressure level approaches that at point 38 where, because of the limiting capacity of the pump and the system already being at pressure, the flow decreases.

This flow decrease causes the system to back along the pump curve to a decreasing pressure below point 36. As pump discharge falls, the flow continues to decrease possibly going even through a reverse flow condition as shown by point 40. This relieves the volume pressure until the pump is capable again of building up the pressure in this system. It is this building and releasing the pressure in the system that causes the pressure oscillation and the instability.

At idle flow represented by point 36 an orifice could be placed in a discharge, resulting in a pressure drop of, for instance 50 psi, producing an effective pump discharge pressure at point 42. The difference between pump curve 32 and the effective pump curve 46 is a result of orifice pressure drop 44 increasing as the square of the flow. It can be seen that the peak pressure is at point 48 as compared to the earlier point 38, thereby decreasing the possible escalation. A higher orifice pressure drop would have even more effect and can be selected such that the effective curve has no rising characteristic at point 42. However it can be seen at high flows the pressure capability with the orifice at place would be intolerable.

FIG. 4 again showing pump curve 32 shows a pressure drop 50 of a fixed opening at the discharge of the pump which is equivalent to 50 psi shown at point 52 while point 54 shows the effective discharge pressure below curve 32. The effective pump curve with this orifice is indicated by curve 56.

A pressure difference regulating valve 60 rather than an orifice is located at the pump discharge. A minimum flow opening through the valve is schematically indicated by orifice 62 in FIG. 1 and the operation of the valve in holding a constant pressure difference across the valve is shown by control loop 64.

Figure 4:
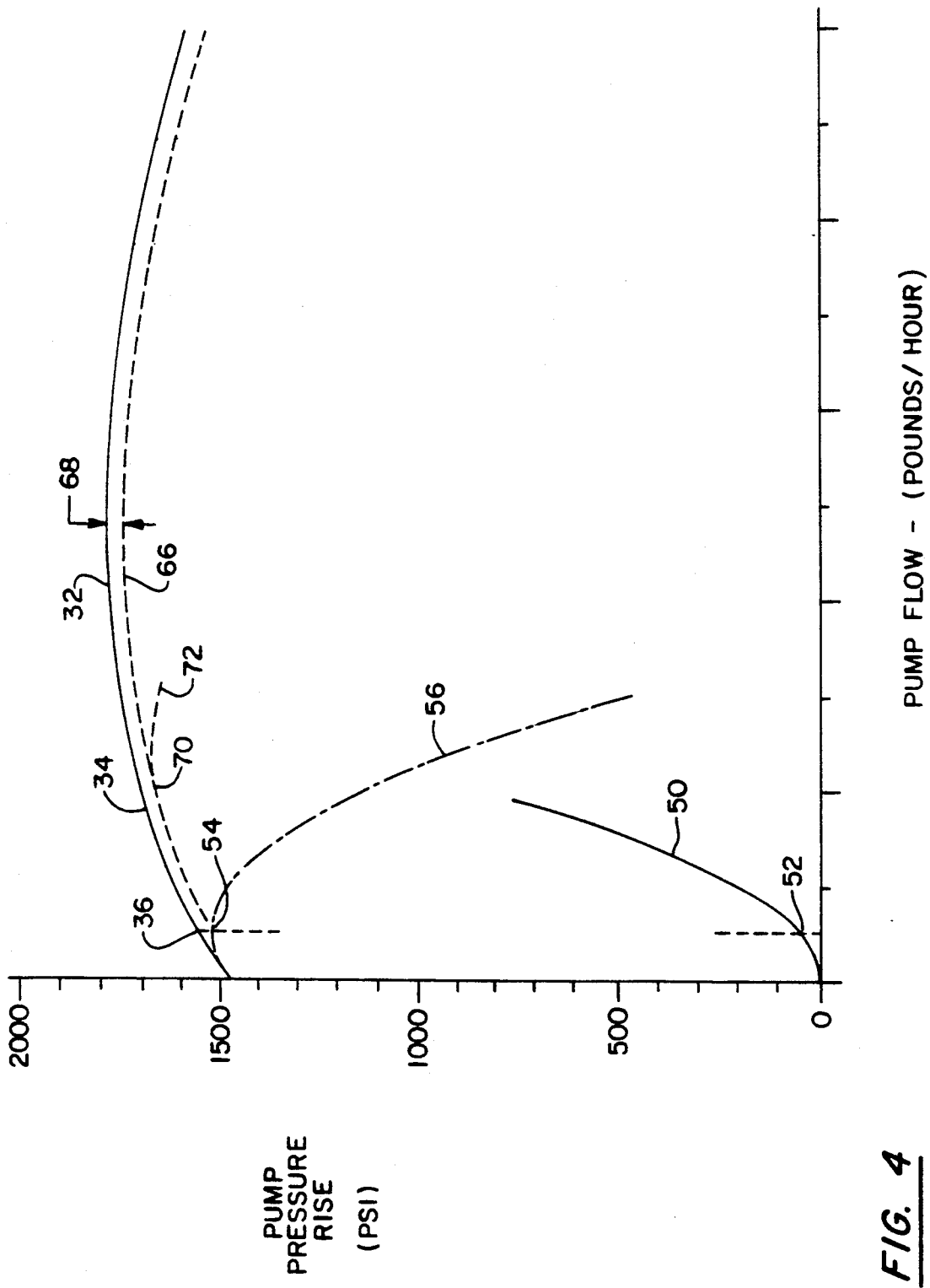
FIG. 4 is a pump curve illustrating the effect of the slow acting pressure difference valve.

The curve 56 in FIG. 4 represents the effective pump discharge operation for rapid changes in the pump flow, with these changes being too rapid for the pressure regulating valve to respond. Curve 66 shows the effective characteristic of a pump during slower flow changes, these being consistent with the normal operation of the fuel system. Pressure differential 68 of approximately 50 psi is maintained at all times.

Point 36 represents the back pressure valve at its minimum opening. It follows at a point such as 70 shows the valve at its partially opened position. Rapid changes around this point due to the pulsations causes the operation along the curve 72.

Figure 5:
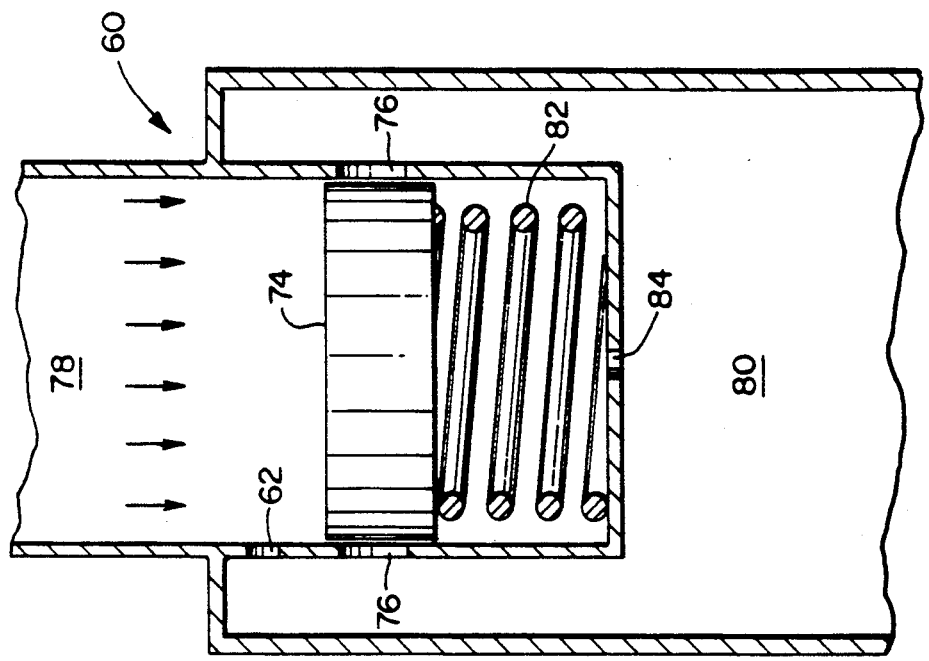
FIG. 5 is a view of a damped back pressure valve.

FIG. 5 shows one form of valve 60 to perform such function. Movable piston 74 covers a variable area 76. Flow from the upstream pipe 78 passes through the fixed orifice 62 and exerts pressure against the piston 74. The downstream pressure in pipe 80 is exposed to the other side of the piston. The pressure differential between area 78 and 80 creates a force against piston 76 resisted by spring 82. This valve accordingly operates to open the variable area orifice 76 a sufficient amount to maintain a desired pressure drop. A damping flow opening 84 is selected to achieve a desired frequency response of the valve.

Even a statically stable system can be dynamically unstable. The dynamic stability or instability can be determined using linear analysis techniques. At points of interest, such as the engine idle speed flow rate, the equations of motion of the fluid system are linearized. The linearized equations are a valid representation of the system dynamics for small perturbations around the operating point Once the system equations have been linearized, stability may be determined using the classical Nyquist frequency response method.

The frequency response of the plumbing system 30 can be defined as the change in flow into the plumbing which corresponds to the sinusoidal variation in pump discharge pressure. The pump responds to the change of flow by changing discharge pressure. For small perturbations in flow, the gain of the pump is equal to the slope of the pump's pressure/flow characteristic. If the slope of this characteristic is positive, then the system becomes a positive feedback system. The requirement for stability for the system is that the frequency response of the plumbing times the pump gain must not encircle the plus one point when the frequency response is plotted in polar coordinates.

Figure 6A:
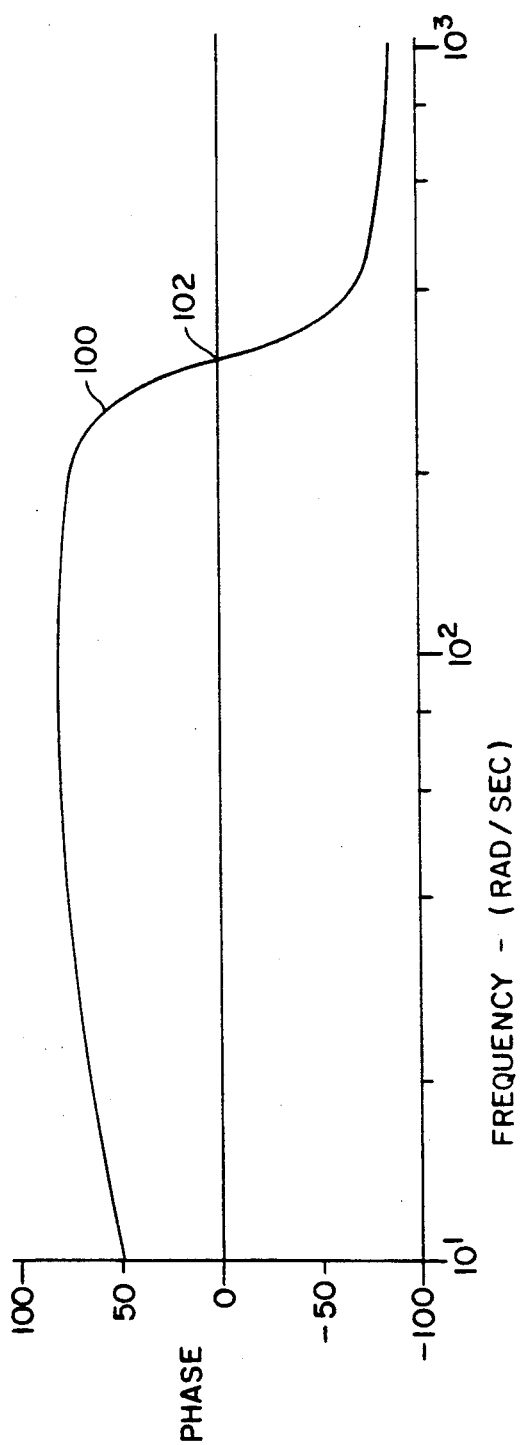
FIGS. 6A and 6B are Bode plots of the plumbing system.
Figure 6B:
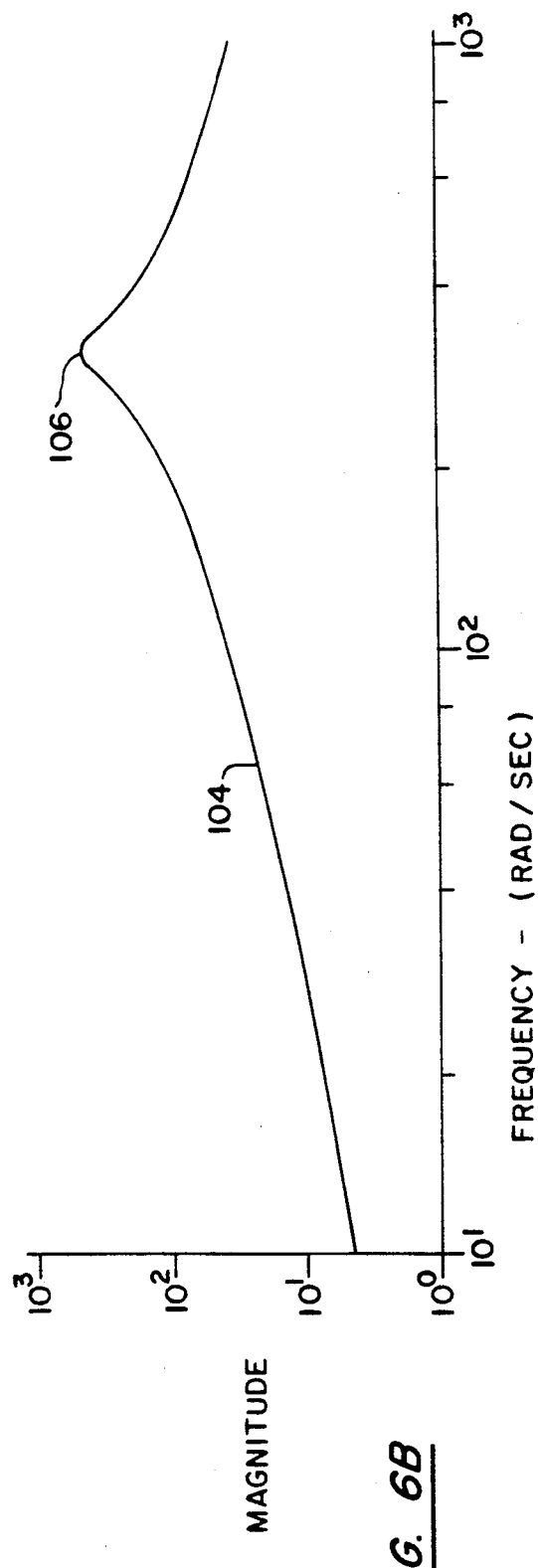

FIGS. 6a and 6b show a frequency response plot for the aircraft gas turbine plumbing system at the idle flow condition. In FIG. 6a curve 100 shows the phase shift between the imposed pressure fluctuation and the resulting flow for various frequencies. At point 102 there is no phase shift with the imposed and resulting frequencies being in phase.

FIG. 6b shows a magnitude of the flow oscillations with curve 104 at a frequency corresponding to point 102 a peak 106 in the magnitude of the flow oscillations occurs. This frequency is the resonant, or natural, frequency of the plumbing system.

Figure 7:
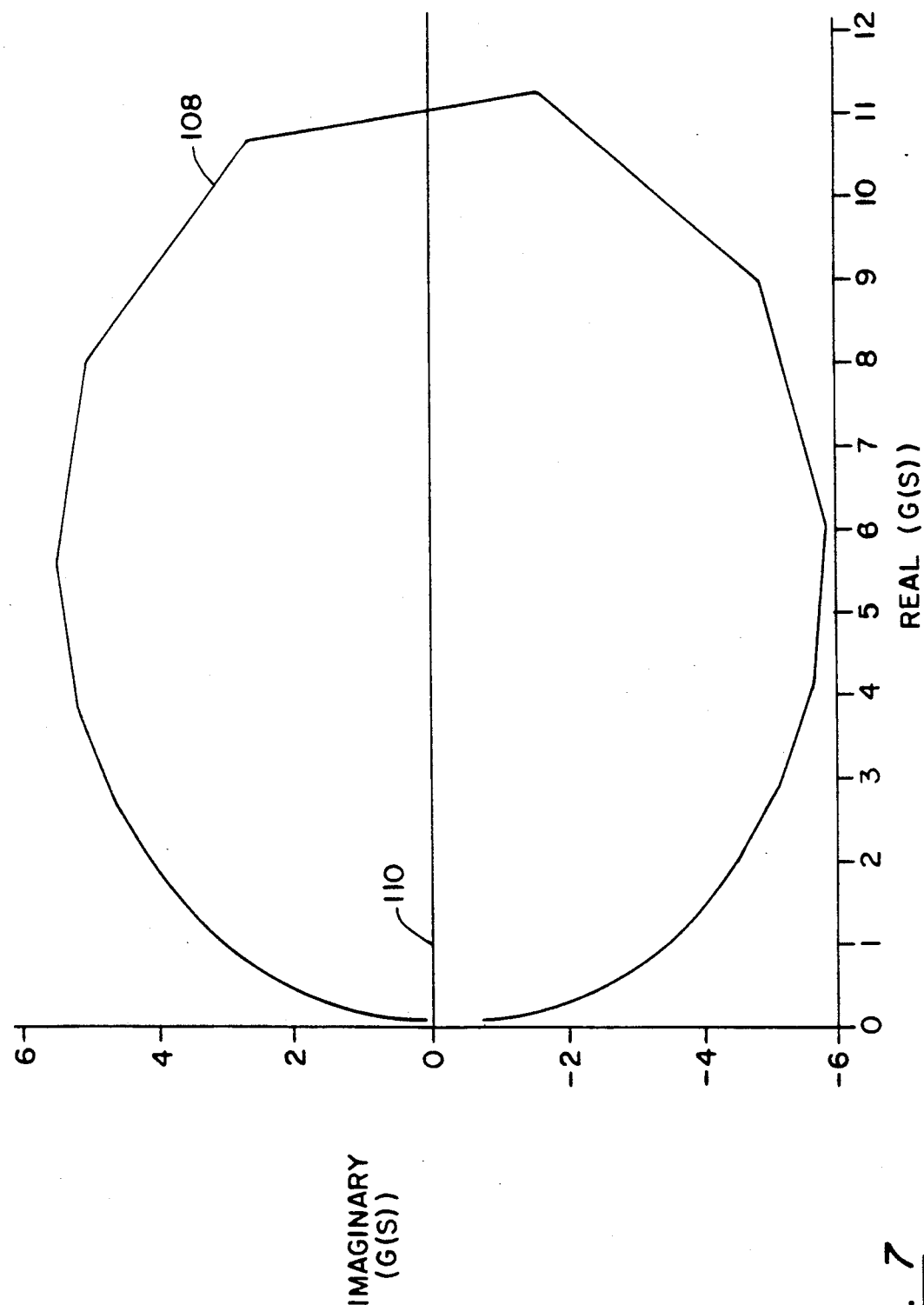
FIG. 7 is a Nyquist plot of the pump and plumbing system.

With the actual pump added the system frequency response shown in FIG. 7 by curve 108. It can be seen that this curve surrounds the unity point 110 and accordingly the stability criteria is violated. Basically substantial reinforcement of the pump discharge pressure oscillations occur when the pressure oscillations are induced in the plumbing. Furthermore, the oscillations are in phase, and thus energy is stored in the system and the oscillations grow.

The fuel system can be stabilized by the addition of a restriction at the pump discharge. This restriction must be small enough that the combined pressure/flow "gain" of the pump and the restriction will be either negative, so that the frequency response will lie to the left of the polar plot, or else sufficiently small so that magnitude of the frequency response will be less than unity.

Figure 8A:
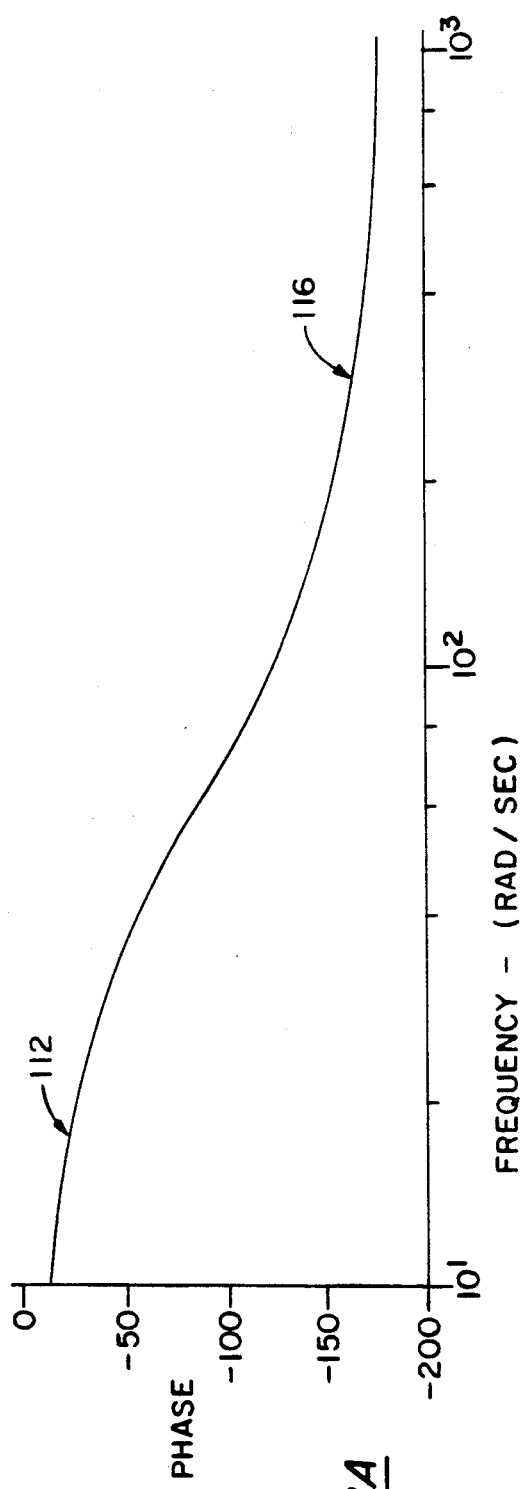
Figure 8B:
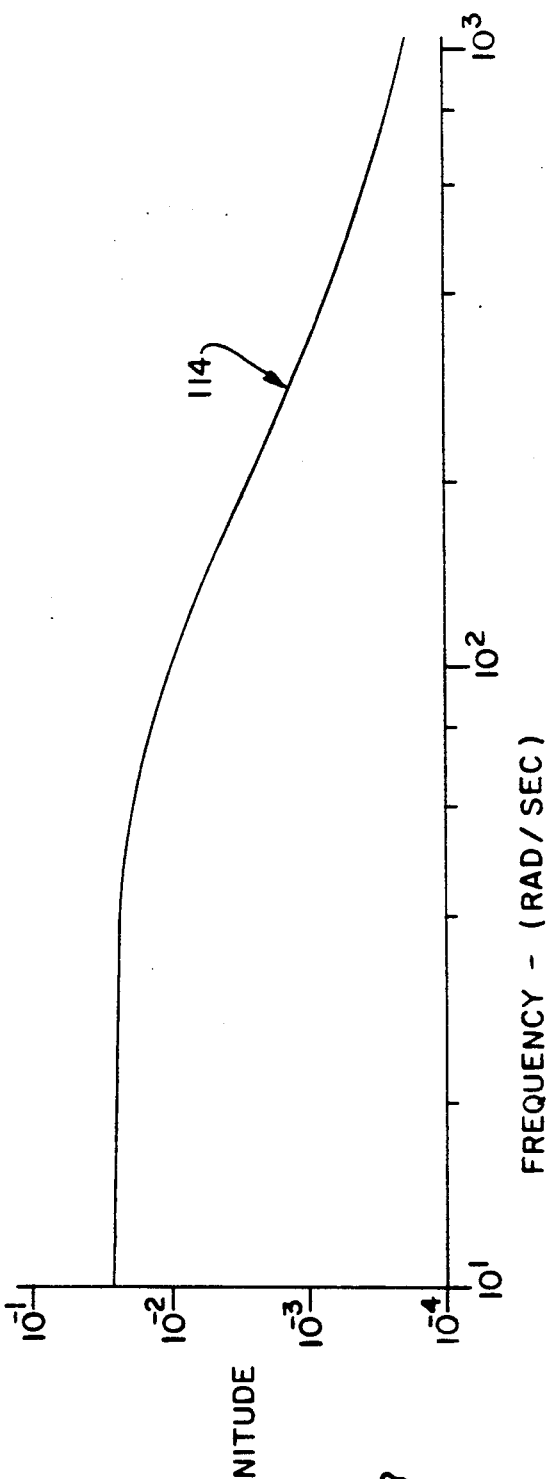

The variable area restriction of valve 60 maintains the relatively constant loss across itself provided that the flow does not change too rapidly The pressure/flow response of the valve and pump combination is shown in FIG. 8a and 8b. At low frequencies the valve and pump gain is positive and has a near zero phase angle as indicated by reference numeral 112, which is desirable for efficient steady state operation. As the frequency of the flow perturbation increases, the gain of the pump/valve as indicated by reference numeral 114 decreases and the phase approaches −180 degrees as shown by reference numeral 116. Therefore, at the resonant frequency of the plumbing system, the pump effectively has a negative slope. In other words, at the system resonant frequency, where the plumbing can store energy, the valve is dissipating more energy than the pump is adding, thus stabilizing the system.

Figure 9:
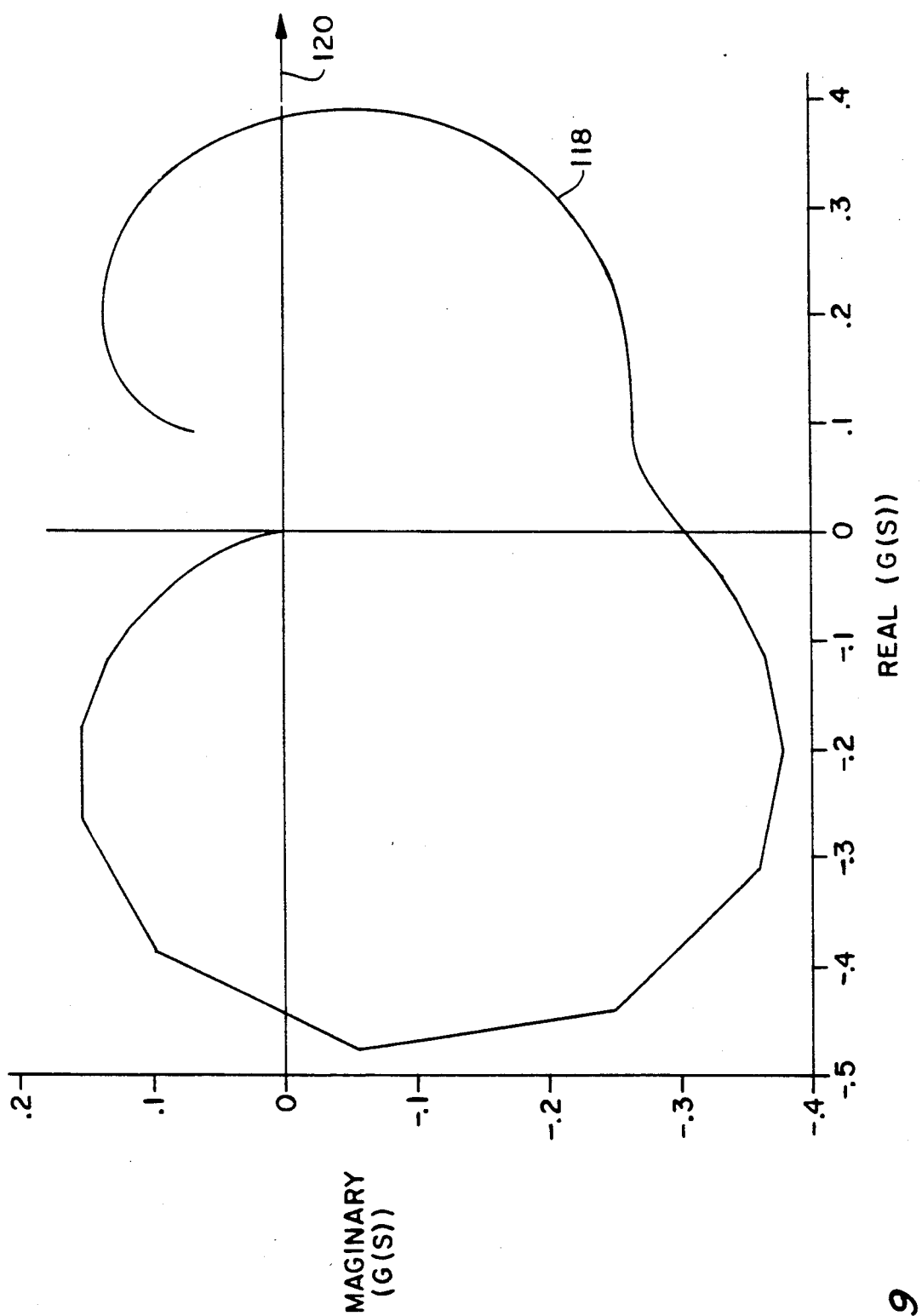
FIG. 9 is a Nyquist plot of the combination.

The effect of the open loop frequency response is shown in FIG. 9 by curve 118. The unity point indicated by arrow 120 is off the curve, and it can be seen that the frequency response no longer encircles this plus 1 point. Therefore in order for a variable area restriction to stabilize the system the valve must be dynamically designed such that the open loop frequency response of the system either has a magnitude less unity at all frequencies, or has a non-zero phase shift in all frequencies which the magnitude exceeds unity.

The frequency response of the valve must be sufficiently rapid to respond to load changes in normal operation, particularly a load decrease. For the system studied the bandwidth of the valve should be between 2 and 30 hertz and preferably between 5 and 10 hertz.

In start up operation of the aircraft engine, the engine is turned by a starter up to an engine speed of 3,000 rpm which is equivalent to a pump speed of 5,000 rpm. At this speed the pump is capable of delivering the 2,000 pounds per hour required to deliver sufficient fuel to the combustors. The orifice size is selected to provide the maximum pressure drop while still allowing adequate pressure at its discharge to provide the desired flow through the combustion nozzles.

Above idle, for moderate flow rates, pump discharge pressure is sufficiently high to easily deliver the desired flow through the combustor nozzles.

At extremely high flows, such as low altitude, high mach number, maximum after burner flow, the pressure required to deliver fuel flow approaches pump discharge pressure. This condition determines the desired valve area and pressure loss when the valve is fully open.

We claim:

1. A centrifugal pump fuel system for an engine driven fuel pump for an aircraft gas turbine engine comprising:
   a centrifugal pump having at constant speed rising head/flow characteristic at low flows;
   a plumbing system receiving flow from said pump, and having at least one control valve located down stream of and defining a discrete volume of said plumbing system;
   a plumbing resonant frequency defined by said discrete volume, the geometry of said plumbing system, and the bulk modulus of the fuel;
   a pressure difference regulating valve located adjacent to the discharge of said pump, up stream of the vast majority of said discrete volume; and
   the frequency response of said regulating valve being significantly less than the frequency response of said plumbing system such that the response of said regulating valve is attenuated at the resonant frequency of said plumbing system.

2. A centrifugal pump fuel system as in claim 1, further comprising:
   said regulating valve having a frequency response such that the open loop frequency of the plumbing system with said regulating valve has a magnitude less than unity at all frequencies, or has a non-zero phase shift at all frequencies at which the magnitude exceeds unity.

3. A centrifugal pump system as in claim 1, further comprising:
   said pressure difference regulating valve having a minimum opening bypass.

4. A fuel system for an aircraft gas turbine engine comprising:
   an engine driven centrifugal fuel pump having at constant speed a rising head-flow characteristic at low flows;
   a combustor;
   a fuel injector for introducing fuel into said combustor;
   a plumbing system connected to receive flow from said pump and to deliver flow to said fuel injectors;
   a control valve in said fuel delivery system between said pump and said fuel injectors;
   a discrete volume of said plumbing system between said pump and said control valve;
   a regulating valve located immediately downstream and adjacent the discharge of said pump, and responsive to the pressure difference across itself;
   a plumbing resonant frequency defined by said discrete volume, the geometry of said plumbing system and the bulk modulus of the fuel being pumped; and
   the frequency response of said regulating valve being significantly less than the response of said plumbing system such that the response of said regulating valve is attenuated at the resonant frequency of said plumbing system at engine idle conditions.

5. A centrifugal pump fuel system as in claim 4, further comprising:
   said regulating valve having a frequency response such that the open loop frequency of the plumbing system with said regulating valve has a magnitude less than unity at all frequencies, or has a non-zero phase shift at all frequencies at which the magnitude exceeds unity.

6. A centrifugal pump system as in claim 4, further comprising:
   said regulating valve having a minimum opening bypass.

7. A centrifugal pump system as in claim 6, further comprising:
   said minimum opening selected to have the maximum pressure drop while allowing sufficient pressure to deliver the required ignition flow through said fuel injectors for initial ignition at the starter driven speed.

* * * * *